United States Patent [19]

Muralidhara

[11] 4,332,584
[45] Jun. 1, 1982

[54] RECOVERY OF POTENTIAL ENERGY AND CHROMIUM VALUES FROM LEATHER TANNERY WASTES

[75] Inventor: H. S. Muralidhara, Fairfax, Va.

[73] Assignee: Systems Consultants, Inc., D.C.

[21] Appl. No.: 231,053

[22] Filed: Feb. 3, 1981

Related U.S. Application Data

[63] Continuation-in-part of Ser. No. 31,847, Apr. 20, 1979, abandoned.

[51] Int. Cl.³ ............................................. C01G 37/08
[52] U.S. Cl. ................................... 8/94.27; 423/607; 423/53; 423/57
[58] Field of Search ..................... 423/53, 55, 57, 607; 8/94.27

[56] References Cited

U.S. PATENT DOCUMENTS

4,086,319 4/1978 Jones .................................. 423/607
4,215,989 8/1980 Cartier ................................ 8/94.20

FOREIGN PATENT DOCUMENTS

1955747 5/1971 Fed. Rep. of Germany ........ 423/53
424671 8/1947 Italy ..................................... 423/53

OTHER PUBLICATIONS

Olsen, "Unit Processes & Principles of Chemical Engineering", Van Nostrand Co., N.Y. 1932, pp. 1-3.

Primary Examiner—Herbert T. Carter
Attorney, Agent, or Firm—Brady, O'Boyle & Gates

[57] ABSTRACT

A method of recovering chromium values and potential energy from liquid and solid leather tannery wastes comprising pyrolyzing the tannery wastes to produce a burnable fuel product comprising gases and liquids and a substantially solid chromium-containing residue, recovering chromium compounds from the solid residue and using the fuel to supply energy for the system.

13 Claims, 2 Drawing Figures

RECOVERY OF POTENTIAL ENERGY AND CHROMIUM VALUES FROM LEATHER TANNERY WASTES

RELATED APPLICATIONS

This is a continuation-in-part of Application Ser. No. 31,847, filed Apr. 20, 1979 and now abandoned.

BACKGROUND OF THE INVENTION

This application relates to a process for treating liquid and solid wastes from the tanning and trimming process of tanneries which convert hides to leather.

In tanneries, prepared hides are treated with one or more of a variety of chemicals to strengthen the leather by a curing or cross-linking of the protein content thereof and to extend the useful life of the leather by preventing putrification. The term "tanning" has become a term of art to describe this chemical treatment due to the fact that tannins were originally employed to cure the hides.

For a considerable period of time, however, chromium compounds have been utilized to achieve tanning of hides. Chromium compounds have the capacity for forming strong coordination bonds and thus stable cross-links between adjacent protein (collagen) molecules.

The cost of the chromium compounds employed in conventional tanning operations is a significant factor in the overall cost of the tannery operation. Significant amounts of chromium values are lost in the liquid waste resulting from the tanning operation. Additionally, large quantities are lost upon disposal of leather waste such as scrap from trimming operations, etc.

Early efforts in the tanning industry to deal with liquid and solid tannery wastes did not focus on recovery of chromium values, but, rather, on disposal of the waste material as landfill, discharge into surface waters, etc. Inasmuch as chromium compounds are toxic, environmental considerations have demanded alternative routes for disposal of such wastes. In addition, efficiency and cost considerations have demanded alternative routes which would enable the recovery of chromium values from the waste material.

The Environmental Protection Agency has been particularly sensitive to problems and control of waste materials in landfills. Tannery leather scrap and treatment sludges are considered potentially hazardous wastes. These wastes, disposed of in landfills, can cause leachate problems for extended periods of time since their rate of degradation is very slow. Where a chromium compound is used for tanning, even more difficult waste disposal problems result due to the toxic nature of the chromium salts. Generally, the chromium compounds are discharged in untreated liquid effluents. It is the disposal of these wastes that gives rise to a major environmental problem for the industry.

The waste disposal problems and the increase in energy and material costs have combined to depress the tanning industry in the United States.

It has been suggested to recover chrome values from liquid tannery wastes through chrome precipitation by raising the pH thereof (Pierce, "Recycling of Chrome Tanning Liquors", J. Am. Leather Chem., Vol. 71 (4), page 161 (1976), or by pickling with cuprous material in an aqueous sulfuric acid medium (Robinson et al, U.S. Pat. No. 3,822,993).

U.S. Pat. No. 3,950,131 to Young describes a method for reclaiming chromium hydroxide from tannery wastes by agitation and continuous filtration through successive filtering zones.

In U.S. Pat. No. 4,086,319 to Jones there is disclosed a process which involves the incineration in an oxidizing atmosphere of tannery wastes at elevated temperatures between 800° F. and 1200° F., preferably between 900° F. and 1000° F. to convert the organic material to gases and the chromium material to ash. The process is directed only at the recovery of chromium from the ash by conventional leaching operations. A similar incineration method, for recovery of chromium, is disclosed by Smith "Chromium Recovery in the Tannery Alkaline Incineration", Leather Manufacturer, Vol. 95 (4), page 16 (1978).

The above-described method of Jones is primarily directed at the recovery of chromium. It is more or less efficient for the recovery of chromium values from tannery wastes. Thus, although U.S. Pat. No. 4,086,319 indicates that the products of incineration may be utilized to generate some of the heat requirements of the chromium recovery system, the disclosed process results in a relatively complete oxidation of the organic material which is required to render the gases suitable for discharge to the atmosphere.

Most importantly, however, the method does not enable an efficacious recovery of chromium in a form suitable for use in the tanning operation. The chromium utilized in the tanning process must be in the trivalent state. During the tanning process the chromium bonds to the protein (collagen) and exhibits trivalency in the bound form. Jones states that chromium may be recovered according to the patented process in the trivalent form (i.e., $Cr_2O_3$) in the ash produced by the incineration or combustion step. The chromium oxide is described as "stable" and "substantially insoluble."

Jones further discloses that chromium in the hexavalent form can be obtained if the combustion is carried out in the presence of basic carbonate. It is further disclosed in the patent that lowering the combustion temperature or effecting incomplete combustion of the organic material still results in the formation of substantial amounts of insoluble, stable chromic oxides.

It is an object of the present invention to provide a method for treating liquid and solid tannery, tanning and finishing process wastes to recover soluble trivalent chromium and potential energy for return to the operation. The process will also reduce environmental control and waste handling requirements.

SUMMARY OF THE INVENTION

The present invention comprises pyrolyzing tannery wastes containing chromium and organic material at a relatively low temperature in the absence of critical amounts of oxygen or in an inert or reducing atmosphere to produce a fuel product comprising gases and liquids and a substantially solid, soluble trivalent chromium-containing residue, separating the fuel product from the chromium-containing residue and recovering chromium from the residue.

The fuel product may be used to produce heat for the pyrolysis step and to produce hot water and/or steam for the tanning process.

DETAILED DESCRIPTION OF THE INVENTION

Figure 1:
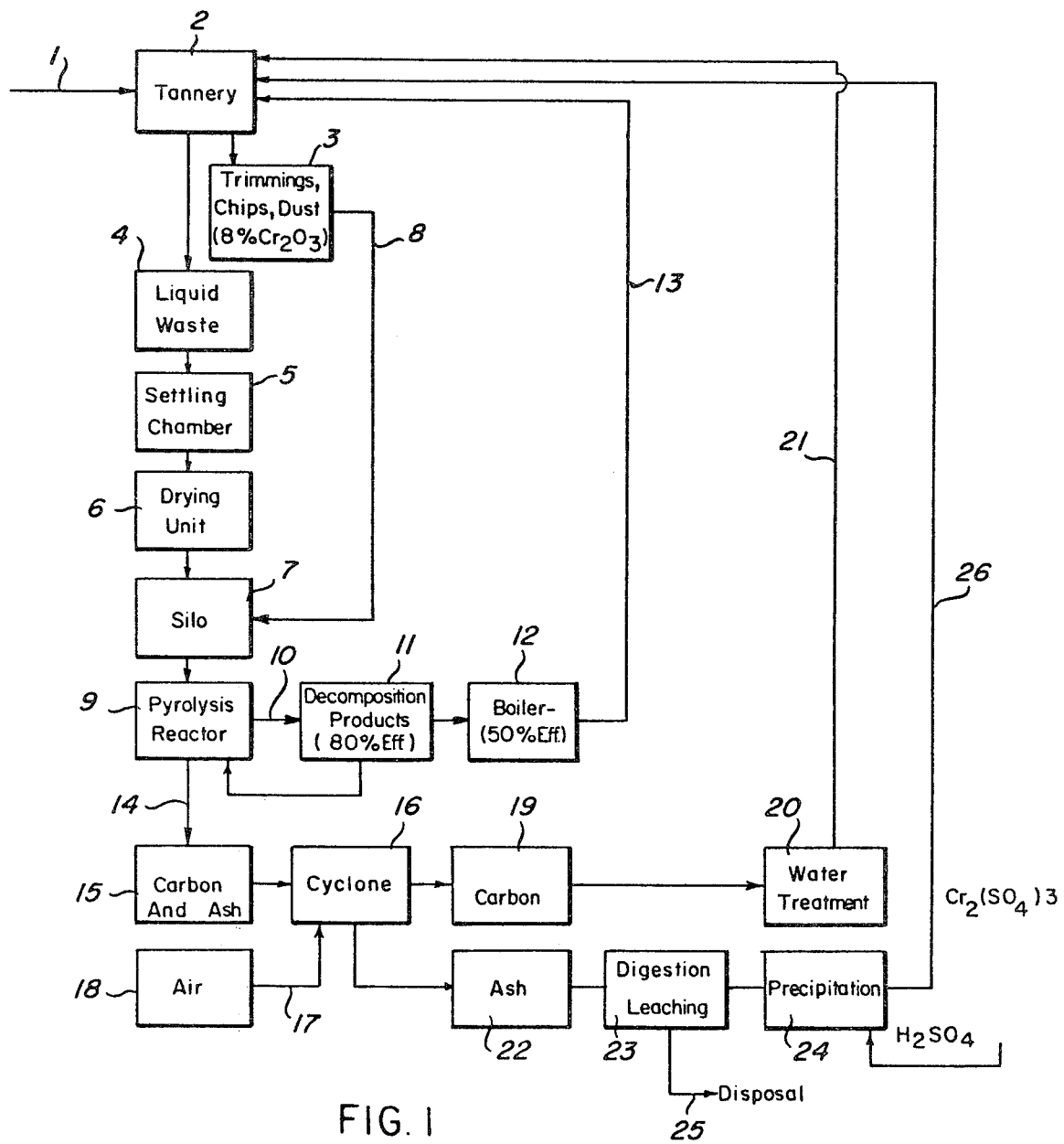
FIG. 1 represents a flow diagram of a preferred method for treating liquid and solid tannery wastes.

The major steps of a basic chrome tanning process for a cattle hide include liming, bating, pickling, tanning and drying. Liming is performed with a 10% lime-sodium sulfide solution to loosen the epidermis and hair. Bating performs two functions, namely, deliming with addition of ammonium sulfate and modification of the hide cell structure through proteolytic enzymes to accept tanning agents. The pickling treatment, with mineral acid, decreases the pH which is adjusted to suit the chromium salts employed.

The leather wastes that derive from the waste streams are organic in nature. Since this waste is carbon based and contains little or no sulfur, it will burn "cleanly". The material has a heating value range from 8,000 to 12,000 BTU per pound. (T. R. Steadman, M. E. D. Hillman, G. E. Pickett, D. A. Scantland, J. A. Vacoment, and T. A. McLure, "Potential Opportunities for Increasing the Utilization of Tannery Offal", The Leather Manufacturer, Oct., 1977).

The solid leather waste generally contains approximately 6-8% chromium as chromium oxides by weight whereas the liquid wastes contain approximately 1% by weight of chromium as chromium oxides based on the weight of the hide.

To date, no method has been proposed for treating or reclaiming tannery waste which would result in the efficient production of energy suitable for use in the tanning process itself while, at the same time, enabling chromium reclamation. It has been previously estimated that approximately 140,000 BTUs are required in a conventional tanning operation to process one hide. It is also known that approximately 140,000 BTUs are required in a conventional tanning operation to process one hide. It is also known that the heating value of leather ranges from 8,000 to 12,000 BTU/$lb_m$. Any reclamation process which could recover the heating value of tannery waste would greatly increase the thermal efficiency of the overall process. Indeed, it is estimated that the solid tannery waste, generated in a conventional tanning operation, would be able to provide at least 50% of the energy required for the basic tanning process itself.

According to the method of the present invention, solid tannery wastes are subjected to a relatively low temperature pyrolysis step to convert the organic portion of the waste to a fuel product comprising, essentially, hydrocarbon gases and liquids, and a residue comprising a trivalent chromium-containing ash and a carbonaceous char. The fuel product is recovered and burned to supply heat for the pyrolysis step and to a boiler or other suitable apparatus to supply hot water and/or steam for the tanning operation.

It is to be understood that by pyrolysis is meant the process by which organic materials are heated to high temperatures in the absence of significant amounts of oxygen, i.e., in an inert or reducing atmosphere, whereby the organic material is thermally decomposed into simpler components. Pyrolysis differs from incinceration or combustion in that, in the latter two processes, the organic material is significantly oxidized whereas in the former no significant oxidation takes place. Pyrolysis of the organic material derived from tannery wastes generally results in the formation of three classes of products:

(a) A gas comprising hydrogen, methane, carbon monoxide and carbon dioxide;

(b) A liquid mixture comprising water, tar, oil and other organics;

(c) A solid residue comprising ash and carbon.

Simultaneously, the non-pyrolyzable residue is processed to separate the char and chromium-containing residue. The char, basically carbon, can be used as a water purifier or burned to produce heat. The chromium residue is processed to recover the chromium content thereof for recycle to the tanning operation.

As noted above, U.S. Pat. No. 4,086,319 discloses a tannery waste treating method which includes a step of "incinerating" the waste at temperatures between 800° F. and 1200° F., preferably 900° F. to 1000° F. Although the patent indicates that the combustion is conducted at relatively low temperatures which results in incomplete combustion of the organic material, it is indicated that the gases are preferably thereafter subjected to additional oxidation and treatments to render them suitable for discharge to the atmosphere. Although the patent characterizes the "incineration" as a relatively low temperature combustion and that the incineration treatment results in the production of a product friom which energy may be recovered, the substantially complete oxidation/combustion of the waste material both during the incineration step and the after treatment of the resultant gases results in the release to the atmosphere of significant amounts of chromium compounds. The toxic nature of the chromium compounds renders their release to the atmosphere a serious environmental problem. Moreover, the oxidation/incineration converts the chromium in the residue to an oxidation state which renders their reclamation difficult. On the other hand, the pyrolysis step of the method of the invention does not result in the release to the atmosphere of chromium compounds and, furthermore, does not result in conversion of the chromium compounds in the residue to compounds which are difficult to recover and convert to recyclable products.

Whereas the incineration or partial combustion process disclosed by the Jones U.S. Pat. No. 4,086,319 results in an ash containing either insoluble chromic oxide or hexavalent chromium compounds which are unsuitable for recycle to the tanning operation, the present process results in an ash containing trivalent chromium in a form which is easily leached therefrom with dilute sulfuric acid. The resulting solution of chromium sulfate can be conveniently recycled to the tanning process without further costly recovery or chemical conversion operations.

While not wishing to be bound by any theory as to the mechanism of the reactions occurring in the pyrolysis step, it is hypothesized that the pyrolysis step merely converts the collagen bound trivalent chromium to a simpler organic complex or mixture of organic complexes of the trivalent chromium. Unlike the insoluble, stable chromic oxide produced by the method of Jones, the organic chromium complex produced by the present process is easily leached from the ash with dilute sulfuric acid for recycle as a tanning liquor after a simple pH adjustment.

Furthermore, the high temperature requirements of the incineration step described in U.S. Pat. No. 4,086,319 and the need for air pollution controls to enable discharge of the gases into the atmosphere renders the incineration operation unattractive from a cost and environmental standpoint.

The temperatures employed in the pyrolysis step of the method of the invention may range from about 500° to about 932° F., preferably from 500° to 700° F., and result in a decomposition of the organic material into various combinations of gases, liquids, tars, etc., which are easily separated for burning to supply heat energy for the tanning and reclamation operations.

The liquid tannery waste produced by conventional tanning operations is de-watered in a settling chamber or by use of centrifugation, filtration, etc., techniques and substantially dried in a suitable dryer. Solid tannery wastes such as leather trimmings, chips, dust, etc., normally containing about 6 to 8%, by weight, of chromium oxides are combined with the previously dried liquid tannery waste and stored in a suitable container. The combined solids are crushed and ground to a suitable particle size, i.e., on the order of $50\mu$ to $200\mu$ and introduced into a preheated pyrolysis reactor. The reactor may be a rotary kiln, a sliding or moving bed reactor or a fluidized bed pyrolysis reactor.

The combustible gases and liquids obtained from the pyrolysis reactor can be burned in a boiler to produce hot water and/or steam. The solid residue comprising carbonaceous material and chromium-containing ash are collected and separated in a solid-solid separation device, i.e., a cyclone. The ash is subjected to leaching with dilute sulfuric acid (i.e., IM solution) and precipitation to obtain a chromium salt suitable for use in the tanning operation. The carbon materials resulting from this process can be used as noted above.

DESCRIPTION OF PREFERRED EMBODIMENT IN THE DRAWINGS

The Figure is a flow chart of the preferred embodiment of the present invention for treating both liquid and solid tannery wastes.

The following characterization of the invention reflects a representative tanning operation handling 1000 hides a working day.

Referring to the flow chart illustrated in the Figure, 1000 hides are subjected to a tanning operation in tannery 1. Each hide weighs approximately 70 pounds. The hides are subjected to a conventional chrome-tanning process. Approximately 19,250 pounds of dry solid leather waste from the tannery, including trimmings, chips, one half of which contains approximately 8%, by weight, of chromium oxide are stored in silo 3. Liquid tannery waste is conveyed to storage silo 4 from where it is conveyed to settling chamber 5. Upon de-watering, the solid residue is conveyed to drying unit 6 wherein it is dried.

The dried residue weighs approximately 193 pounds and is conveyed to storage silo 7. The solid leather waste from silo 3 is also conveyed via line 8 to silo 7 where it is combined with the dried liquid waste.

The approximately 19,400 pounds of combined product are then conveyed to pyrolysis reactor 9 wherein the waste is pyrolyzed at a temperature between 500° and 700° F. which requires a thermal input of about $0.12 \times 10^8$ BTU. The fuel product comprising liquid and gases produced in the pyrolysis reactor are taken off via line 10 through container 11. A portion of the decomposition products are recycled to the pyrolysis reactor to supply the energy to maintain the pyrolysis reaction. The remainder of the decomposition products are conveyed to boiler 12 for burning to supply hot water and/or steam for recycle through line 13 to tannery 2. The boiler is approximately 50% efficient and the heating value of the waste material is about $8.85 \times 10^3$ BTU per pound, thereby supplying about $0.79 \times 10^8$ BTUs to the tanning process.

The solid residue from the pyrolysis reactor is conveyed from pyrolysis reactor through line 14 to silo 15. The solid residue is then conveyed to cyclone 16 supplied with air via line 17 from air supply means 18. The cyclone effects a separation of the carbonaceous char or activated carbon and the chromium-containing ash. Approximately 970 pounds of carbonaceous char are conveyed to carbon storage silo 19. The carbonaceous char is used to treat water in zone 20 and the water is recycled via line 21 to tannery 2.

Approximately 970 pounds of chromium-containing ash are obtained from cyclone 16 and stored in ash silo 22. The chromium-containing ash is subjected to digestion, leaching and precipitation in zones 23 and 24, respectively. Approximately 194 pounds of waste are obtained which is conveyed via line 25 for disposal. 1940 pounds of IM sulfuric acid solution are utilized for precipitation in zone 24 to obtain approximately 2500 pounds of chromium-sulfate which is recycled via line 26 to tannery 2.

As is evident from the above-described embodiment, the process of the invention enables complete recovery of chromium from the tannery waste as well as a considerable savings in energy input required for the tanning operation.

There are three major alternatives for disposing of leather wastes; they include: landfill, incineration (combustion) and pyrolysis (non-oxidative heating).

The following table illustrates the advantages and disadvantages of the above-named alternatives for tannery waste handling:

TABLE 1

| DISPOSAL CONCEPT | ADVANTAGES | DISADVANTAGES |
|---|---|---|
| Landfill | Relatively simple and inexpensive. | Decomposition of leather waste is very slow. |
| | Can have beneficial effects reclaiming land otherwise unsuitable for commercial, residential or recreation purposes. | Leather decomposition produce potential leachates which may cause groundwater contamination. |
| | | Chromium deposits can be a health problem |
| Incineration | A long established process with known cost and reliability characteristics. | Has a poor public image largely due to air pollution effects. |
| | Reduces the need for landfill sites. | Major technical problems; high temerature of operation, slag build-up, corrosion, and generation of noxious gases. |
| | Heat and chromium compound recovery contributes to reducing energy/material needs in the industry. | Chromium is relatively difficult to recover. |
| Pyrolysis | Reduces the need for landfill sites. | Number of processing steps are higher. |
| | Can be environmentally clean. | Some additional equipment is required. |
| | The potential for public acceptability of pyrolysis plants appears generally much higher than that for incinerators. | Some increase in operation cost. |
| | | Less energy recovered for tannery operation. |
| | Plants require smaller | |

TABLE 1-continued

| DISPOSAL CONCEPT | ADVANTAGES | DISADVANTAGES |
|---|---|---|
| | capital investment and operating cost than incinerators because of lower operating temperatures. The large air transport capacities of incinerators are not required. Chromium can be recovered effectively and relatively inexpensively in a form suitable for efficient recycle to the tanning operation. Significant air pollution control devices are not necessary. The fuel products and chrome recovery can significantly reduce the energy and chrome needs in the leather processing industry, thus increasing the overall system efficiency. | |

The net energy and material saving for a representative 1000 hide per day tannery neglecting initial capital and operating costs is the sum of the direct and indirect energy saving in the process minus the energy added to the process and the reduction in chromium costs as noted here:

```
Net energy saving  = net value of pyrolysis fuel products
                   = $268/day
      where 1 × 10⁶ BTU = $4
Net material savings = value of displace Cr compound
                   = $620/day
      where Cr compound = $2000/ton
Net cost savings   = energy savings and material saving
                   = $268/day + $620/day
                   = $888/day
```

A series of tests were conducted to demonstrate the effect of temperature and oxygen concentration on the recovery of chromium from the ash produced by the pyrolysis method of the present invention. Typical chrome-tanned leather waste materials were pyrolyzed in a tube furnace at different temperatures, i.e., 662°, 932°, 1202° and 1472° F. At each temperature, the pyrolysis was carried out at the oxygen concentrations of 0%, 10.5% and 21%. The char samples were leached for eight hours in 50 ml of 1 M sulfuric acid. The leached solutions were filtered and the residue ashed. The ash was fused with sodium hydroxide and potassium nitrate. The melt was dissolved and diluted to a known volume. The chromium concentration was then determined in both the leachate and the dissolved melt by atomic absorption spectrometry. The percent recoverable chromium was determined by the formula:

$$\frac{\text{Cr in leachate}}{\text{Cr in leachate} + \text{Cr in residue}}$$

The results from these tests were reviewed and an additional matrix of tests was run. The tests were run at 752° F. and 842° F. The oxygen concentration was run at 0%, 10.5% and 21% at each temperature employing the same test procedures described above.

Figure 2:
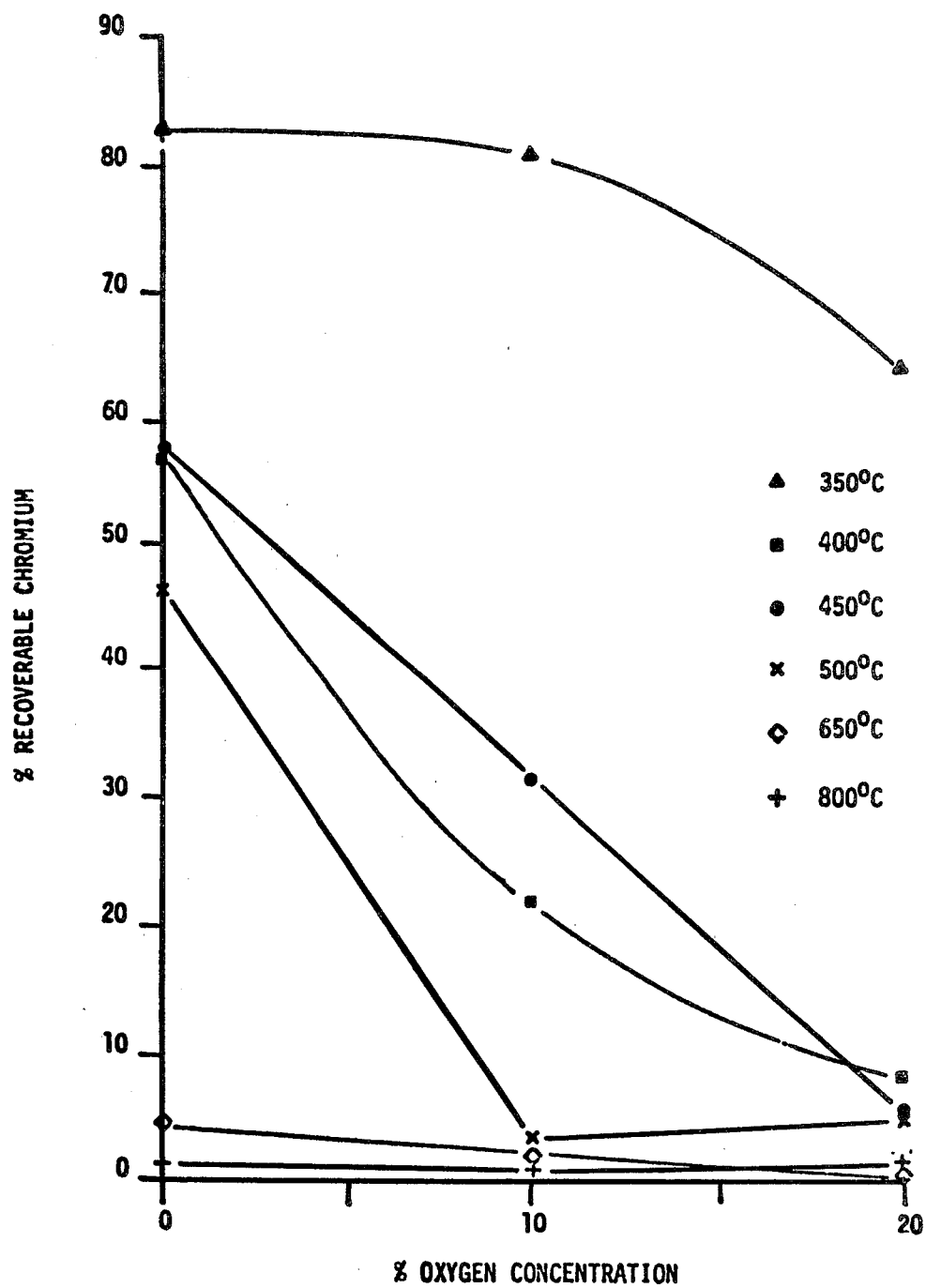
FIG. 2 is a plot depicting the percentage of chromium recoverable according to the method of the invention as a function of oxygen concentration.

The percent recoverable chromium is plotted versus the percent oxygen concentration and is shown in FIG. 2. Each curve represents a different temperature. The best results were obtained at 662° F. and oxygen concentrations of 0% and 10%. Very similar results were obtained at 752° F. and 842° F. At 932° F. and above, the percent recoverable chromium fell off rapidly.

There was also a sharp reduction in recoverable chromium with increasing oxygen concentration at the lower temperatures. Brief visual observations were made of the samples during pyrolysis. When samples were run at 752° F. and above in the presence of oxygen, some ignition was observed with some samples. This would correspond to the reduced recoveries of chromium at these temperatures and oxygen concentrations.

Low recoveries of chromium were observed at all concentrations of oxygen at 1202° F. and 1472° F. This was most likely caused by the chromium reacting with the oxygen present in the leather to form the insoluble oxide, $Cr_2O_3$, at the higher temperatures.

I claim:

1. A method of treating substantially solid tannery waste material containing chromium and organic matter to recover chromium in the +3 valence state and to produce fuel products comprising:
    (a) pyrolyzing said solid tannery waste to produce a fuel product comprising burnable gases and liquids and substantially solid residue containing chromium in a +3 valence state as an organic chromium complex soluble in an about 1 M sulfuric acid solution,
    (b) separating said burnable fuel product from said chromium-containing residue, and
    (c) recovering chromium compounds from said residue by dissolution in an about 1 M sulfuric acid solution said pyrolysis comprising subjecting said solid tannery waste in a pyrolysis zone to a temperature between 500° F. and 932° F. in the absence of an amount of gaseous oxygen substantially above about 10%.

2. The method of claim 1 wherein said substantially solid tannery waste material is a mixture of chrome-tanned leather scrap and a de-watered and substantially dried liquid tannery waste.

3. The method of claim 1 wherein said solid tannery waste is pyrolyzed at a temperature of from about 500° F. to about 700° F.

4. The method of claim 1 wherein at least a portion of said separated burnable fuel product is burned to supply heat to said pyrolysis zone.

5. The method of claim 1 wherein at least a portion of said separated burnable fuel product is burned in a boiler to produce hot water or steam.

6. The method of claim 1 wherein said chromium-containing residue is treated to separate carbonaceous material from said residue.

7. The method of claim 1 wherein substantially all of said chromium is recovered from said treated residue by digestion and leaching with dilute aqueous sulfuric acid.

8. The method of claim 1 wherein at least a portion of said substantially solid tannery waste material comprises chrome-tanned leather scrap.

9. The method of claim 1 wherein said substantially solid tannery waste is obtained by drying a substantially liquid tannery waste.

10. A method of treating both liquid and solid tannery waste containing chromium and organic material to recover chromium and to produce burnable fuel products comprising:
  (a) de-watering and substantially drying said liquid tannery waste,
  (b) combining said de-watered and dried liquid tannery waste with said solid tannery waste
  (c) pyrolyzing said combined wastes in a pyrolysis zone at a temperature of from about 500° F. to about 932° F. in the absence of an amount of gaseous oxygen substantially above about 10% to produce a burnable fuel product comprising gases and liquids and a substantially solid residue containing chromium in a +3 valence state as an organic chromium complex soluble in an about 1 M sulfuric acid solution,
  (d) separating said burnable fuel product from said chromium-containing residue,
  (e) recovering chromium from said residue by dissolution in an about 1 M sulfuric acid solution,
  (f) burning a portion of said burnable fuel product to supply heat to said pyrolysis zone, and
  (g) burning a portion of said burnable fuel product in a boiler to produce hot water and/or steam.

11. The method of claim 10 wherein said chromium-containing residue is treated to separate carbonaceous material from said residue.

12. The method of claim 10 wherein substantially all of said chromium is recovered from said treated residue by digestion and leaching and precipitation utilizing dilute aqueous sulfuric acid.

13. In a process for tanning leather with a chromium-containing compound whereby chromium compound containing liquid and solid leather waste materials are produced as by-products, the improvement comprising:
  (a) de-watering and substantially drying said liquid tannery waste,
  (b) combining said de-watered and dried liquid tannery waste with said solid tannery waste,
  (c) pyrolyzing said combined wastes in a pyrolysis zone at a temperature of from about 500° F. to about 932° F. in the absence of an amount of gaseous oxygen substantially above about 10% to produce a burnable fuel product comprising gases and liquids and a substantially solid residue containing chromium in a +3 valence state as an organic chromium complex soluble in an about 1 M sulfuric acid solution,
  (d) separating said burnable fuel product from said chromium-containing residue,
  (e) recovering chromium from said residue by leaching with an about 1 M sulfuric acid solution,
  (f) burning a portion of said burnable fuel product to supply heat to said pyrolysis zone,
  (g) burning a portion of said burnable fuel product in a boiler to produce hot water and/or steam, and
  (h) recycling said recovered chromium to said tanning step.

* * * * *